(12) United States Patent
Jupudi

(10) Patent No.: US 10,425,946 B2
(45) Date of Patent: Sep. 24, 2019

(54) WIRELESS STATION STEERING BASED ON STATION DATA EXCHANGE CAPACITY

(71) Applicant: Fortinet, Inc., Sunnyvale, CA (US)

(72) Inventor: Siva Rama Krishna Rao Yogendra Jupudi, Karnataka (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/273,663

(22) Filed: Sep. 22, 2016

(65) Prior Publication Data

US 2018/0084538 A1   Mar. 22, 2018

(51) Int. Cl.
| | |
|---|---|
| *H04W 72/04* | (2009.01) |
| *H04W 8/22* | (2009.01) |
| *H04B 7/06* | (2006.01) |
| *H04W 84/12* | (2009.01) |
| *H04W 88/10* | (2009.01) |

(52) U.S. Cl.
CPC ........ *H04W 72/048* (2013.01); *H04B 7/0617* (2013.01); *H04W 8/22* (2013.01); *H04W 72/0453* (2013.01); *H04W 72/0486* (2013.01); *H04W 84/12* (2013.01); *H04W 88/10* (2013.01)

(58) Field of Classification Search
CPC . H04W 84/12; H04W 72/0453; H04W 48/08; H04W 28/20; H04W 88/10; H04W 24/02; H04W 48/14; H04W 40/246; H04W 48/20; H04W 72/04; H04W 72/1273; H04W 72/1284; H04W 74/006; H04L 1/0036

See application file for complete search history.

(56) References Cited

U.S. PATENT DOCUMENTS

| | | | |
|---|---|---|---|
| 2014/0146716 A1* | 5/2014 | Chen ......................... | H04L 5/16 370/277 |
| 2014/0269461 A1* | 9/2014 | Mehta ....................... | H04L 5/06 370/297 |
| 2016/0316392 A1* | 10/2016 | Pantelidou ............ | H04W 48/02 |
| 2017/0374602 A1* | 12/2017 | Gokturk ................ | H04W 40/36 |

* cited by examiner

*Primary Examiner* — Awet Haile
(74) *Attorney, Agent, or Firm* — Law Office of Dorian Cartwright; Dorian Cartwright

(57) ABSTRACT

Wireless stations of a Wi-Fi network based are steered to either a high throughput channel or a low throughput channel based on data exchange capacity, in addition to dual-band capability. A probe request data packet from a wireless station seeking to join a channel of the plurality of channels supported by the access point is detected. Dual-band capability is determined as indicated by the probe request. Responsive to having dual-band capability, a high throughput capability of the wireless station is determined as indicated by the probe request. Responsive to having high throughput capability, the wireless station is assigned to a high throughput channel. A probe response data packet with a channel assignment is generated for transmission to the wireless station.

19 Claims, 7 Drawing Sheets

| Element ID | Length | HT Capabilities Info | A-MPDU Parameters | Supported MCS Set | HT Extended Capabilities | Transmit Beamforming Capabilities | ASEL Capabilities |
|---|---|---|---|---|---|---|---|

| Element ID | Length | VHT Capabilities Info | Supported VHT MCS and NSS Set |
|---|---|---|---|

WIRELESS STATION STEERING BASED ON STATION DATA EXCHANGE CAPACITY

FIELD OF THE INVENTION

The invention relates generally to computer networking, and more specifically, to wireless client steering con a computer network based on station data exchange capability.

BACKGROUND

Wireless devices such as smart phones and tablet computing devices continue to proliferate, adding to the total number of mobile devices that seek pervasive Wi-Fi connectivity. The rapid introduction of advancing apps and Internet use on these mobile devices adds to the challenge of network support in an enterprise environment. In particular, enterprises are faced with significant challenges in identifying best practices in their build out of their wireless local area network (LAN) environment.

Wireless LAN technology continues to evolve as wireless connection speeds advance. Wireless networks must therefore be configured to support multiple device types, including legacy 802.11 a/b/g/n devices, current 802.11ac devices, and future 802.11ac wave2 devices that enable greater than 1.7 Gbit/s speeds. The upper limit of such wireless LAN connections will continue to advance, therefore placing an increased burden on wireless LAN networks in providing sufficient support over a defined geography and a mix of wireless devices.

With increasing mix of wireless devices, the lower data rate capable client will occupy the channel which results in lower time available for data exchange by the faster data rate capable clients. Band steering is a well adopted solution to improve capacity, throughput, and the experience for users of crowded wireless networks. In a wireless digital network having at least one central controller and a plurality of access nodes connected to the central controller, and wherein some of the access nodes support a preferred wireless band and at least one non-preferred wireless band, the central controller identifies wireless client devices capable of multi-band operation, and encourages them to connect to the preferred wireless band. Client devices may be identified as multi-band capable by tracking probe requests. Band steering with 5 GHz preferred band configuration works in the access point by directing 5 GHz-capable clients to that band. When the access point hears a request from a client to associate on both the 2.4 GHz and 5 GHz bands, it knows the client is capable of operation in 5 GHz. It steers the client by responding only to the 5 GHz association request and not the 2.4 GHz request. The client then associates in the 5 GHz band. Band steering helps to use spectrum efficiently.

However, conventional steering methods are not efficient with growing number of Wi-Fi devices capable of operating in both 2.4 GHz and 5 GHz and technology advances in wireless modulation and transmission techniques.

What is needed is a robust technique to steer based on client data exchange, in addition to bandwidth capability alone.

SUMMARY

These shortcomings are addressed by the present disclosure of methods, computer program products, and systems for steering wireless stations of a Wi-Fi network based on data exchange capacity.

In one embodiment, a probe request data packet from a wireless station seeking to join a channel of the plurality of channels supported by the access point is detected. Dual-band capability of the wireless station is determined from the probe request. Responsive to having dual-band capability, a high throughput capability of the wireless station is determined from the probe request. Responsive to having high throughput capability, the wireless station is assigned to a high throughput channel (e.g., a 5 GHz channel). A probe response data packet with a channel assignment is generated for transmission to the wireless station. Wireless stations without high throughput capability can be assigned to a low throughput channel (e.g., 2.4 channel).

In other embodiments, high throughput capability is determined from data fields of the probe request, corresponding to supported channel width set, forty MHz intolerance, MU (multiple user) beamformer, MU beamformee, number of supported spatial streams, and channel modulation, for instance.

Advantageously, the access points operate more bandwidth efficient by moving low throughput wireless stations with dual-band capability to a low throughput channel.

BRIEF DESCRIPTION OF THE DRAWINGS

In the following drawings, like reference numbers are used to refer to like elements. Although the following figures depict various examples of the invention, the invention is not limited to the examples depicted in the figures.

FIGS. 4-5 are block diagrams illustrating data packets indicative of HT and VHT capabilities, according to some embodiments.

DETAILED DESCRIPTION

The description below provides methods, computer program products, and systems for steering wireless stations of a Wi-Fi network based on data exchange capacity. One of ordinary skill in the art will recognize many additional variations made possible by the succinct description of techniques below.

Systems to Steer Wireless Stations Based on Data Exchange Capacity (FIGS. 1-5)

Figure 1:
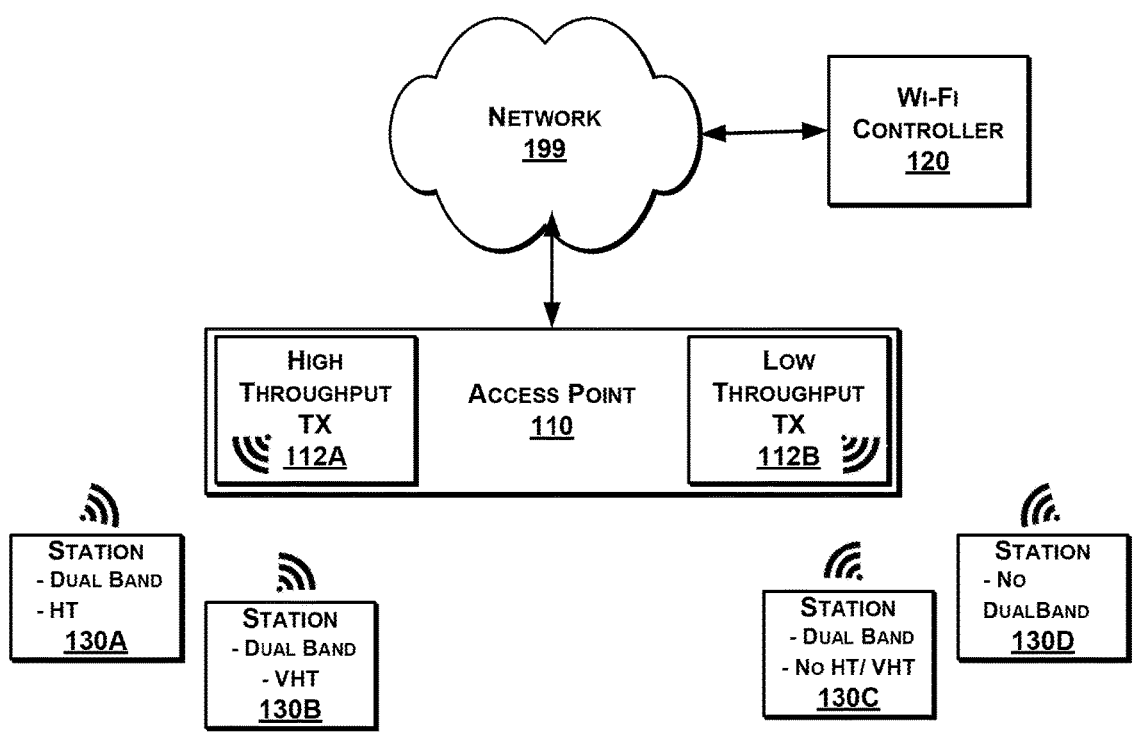
FIG. 1 is a high-level block diagram illustrating a system to steer wireless stations based on data exchange capacity, according to one embodiment.

FIG. 1 is a high-level block diagram illustrating a system 100 to steer wireless stations of a Wi-Fi network based on data exchange capacity, according to one embodiment. The system 100 comprises an access point 110, a Wi-Fi controller 120, and stations 130A-D having varying capabilities.

Network components can be directly or indirectly coupled to a network 199, such as a LAN (local access network, a WAN (wide area network), the Internet, a cellular network, through any suitable wired (e.g., Ethernet) or wireless (e.g., Wi-Fi or 4G) medium, or combination. The stations 130A-D are coupled by Wi-Fi connection to the access point 110 which in turn is connected to the network 199 (i.e., to network backbone components therein), preferably through a wired connection. The stations 130A,B are connected to high throughput channels while the stations 130C,D are connected to low throughput channels. Finally, the Wi-Fi controller 120 is also connected to the network 199, preferably through a wired connection. Many variations are possible. For example, there can be additional components such as firewalls, routers, and more switches and stations. Additionally, components can be implemented with a single physical box, or, each could represent a cluster of physical boxes acting in coordination. The system 100 can be implemented locally as a LAN or be implemented in the cloud with certain components being remotely available (e.g., through a firewall). Wi-Fi components can communicate using IEEE 802.11 protocols, including IEEE 802.11n and IEEE 802.11ac.

Figure 7:
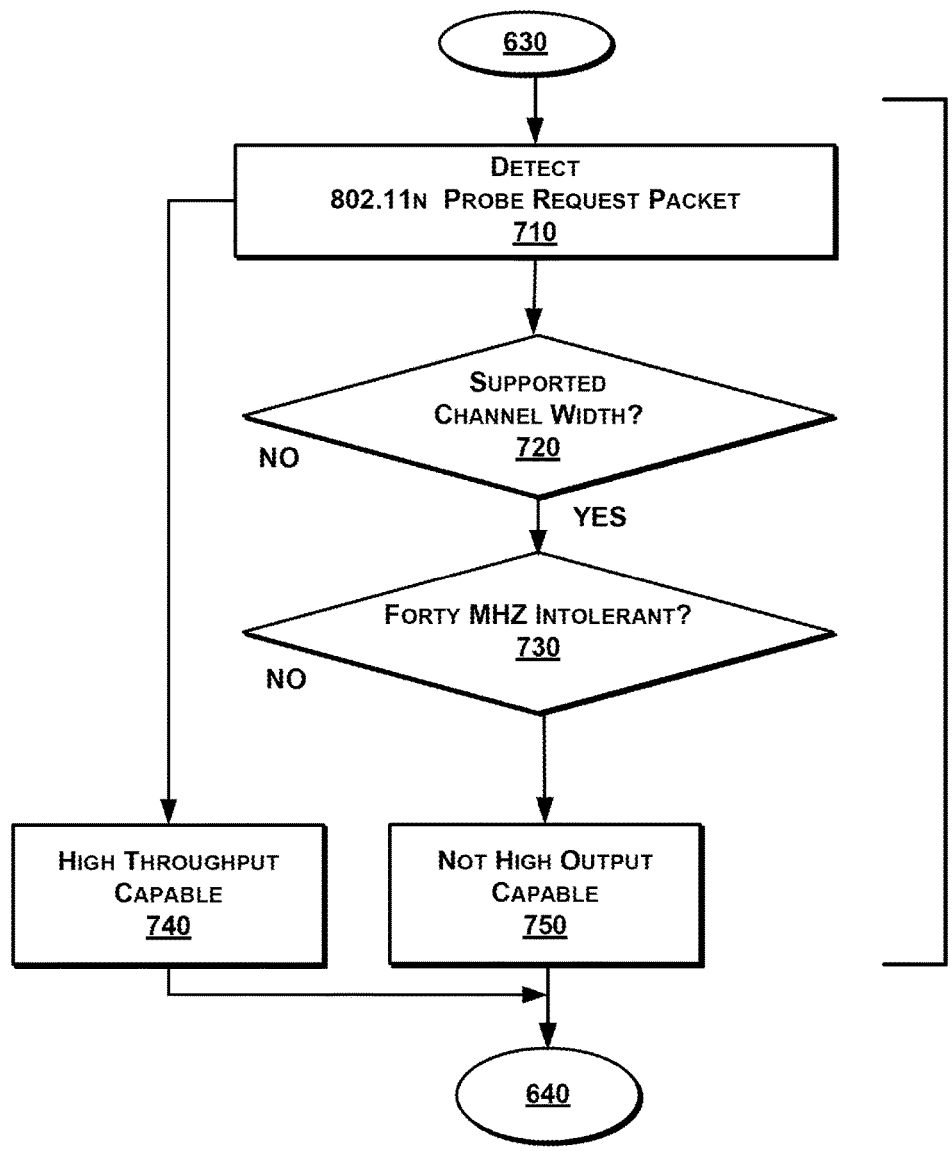
FIGS. 7-8 are each more detailed flow diagram illustrating the step of determining throughput capabilities from the method of FIG. 6, according to one embodiment.
Figure 8:
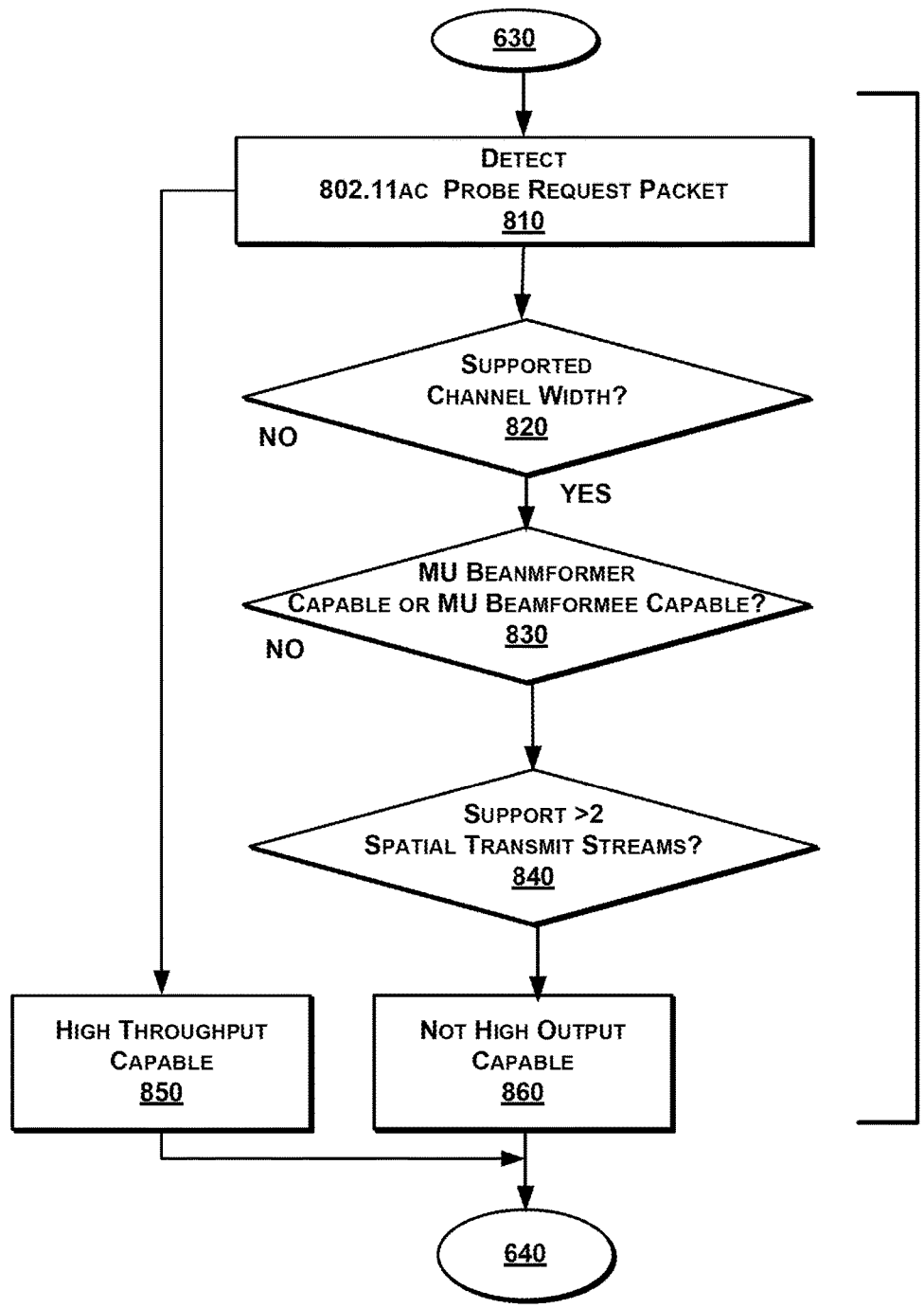

The access point 110 includes a high throughput transceiver 112A (e.g., a 5 GHz transceiver) and a low throughput transceiver 112B (e.g., a 2.4 GHz transceiver). Embodiments with different bandwidth combinations are possible, as well as different numbers of transceivers. In operation, the access point 110 periodically transmits beacons to advertise services and available BSSIDs. Wireless stations within radio range may choose to join the network and send a probe request to initiate the connection process. The probe request data packet (or association request or authentication request data packets) includes fields, as shown in FIGS. 4 and 5, from which throughput capability can be determined, as shown in FIGS. 7 and 8. In turn, the access point 110 sends a probe response to cooperate in the connection process. One element of the probe response is a channel assignment.

The channel assignment depends on data exchange capabilities of the wireless station. As illustrated in FIG. 1, the station 130D having only 2.4 GHZ band capability is assigned to the low throughput transceiver 112B. The station 130C does have dual-band capability for connecting to the high throughput transceiver 112A, but since the throughput capabilities are low, network performance can be improved by assigning the station 130C to the low throughput transceiver 112B as well. It is the station 130B which supports dual-band as well as HT, and the station 130A which supports dual-band as well as VHT, that are assigned to the high throughput transceiver 112A.

Additional embodiments of the access point 110 are described below in association with FIG. 2.

The Wi-Fi controller 120 manages access points and can affect local transceiver assignments with global steering polices or global conditions. Additionally, the Wi-Fi controller 120 can profile a station and store throughput capabilities in a table. When setting up an access point for a hand-off, channel assignments can be provisioned prior to actually making contact with the roaming station.

Other tasks of the Wi-Fi controller 120 can include managing other aspects of access points and stations and their relationship, for example, managing BSSID assignments and hand-offs, implementing system-wide Wi-Fi policies, load balancing, managing a number of station connections at a particular access point, and the like. The Wi-Fi controller policies, as implemented, can override, co-exist, or compete with the access point policies concerning channel assignment. Additional embodiments of the Wi-Fi controller 120 are set forth in FIG. 3.

The stations 130A-D use the channel assignment for exchanging data with the network 199 via the access point transceivers 112A,B. The stations 130A-D include a Wi-Fi card with a transceiver. Mobile stations can move from one access point to another in the system. Once profiled by the system 100, the network components may already be aware of throughput capabilities before making contact.

Figure 9:
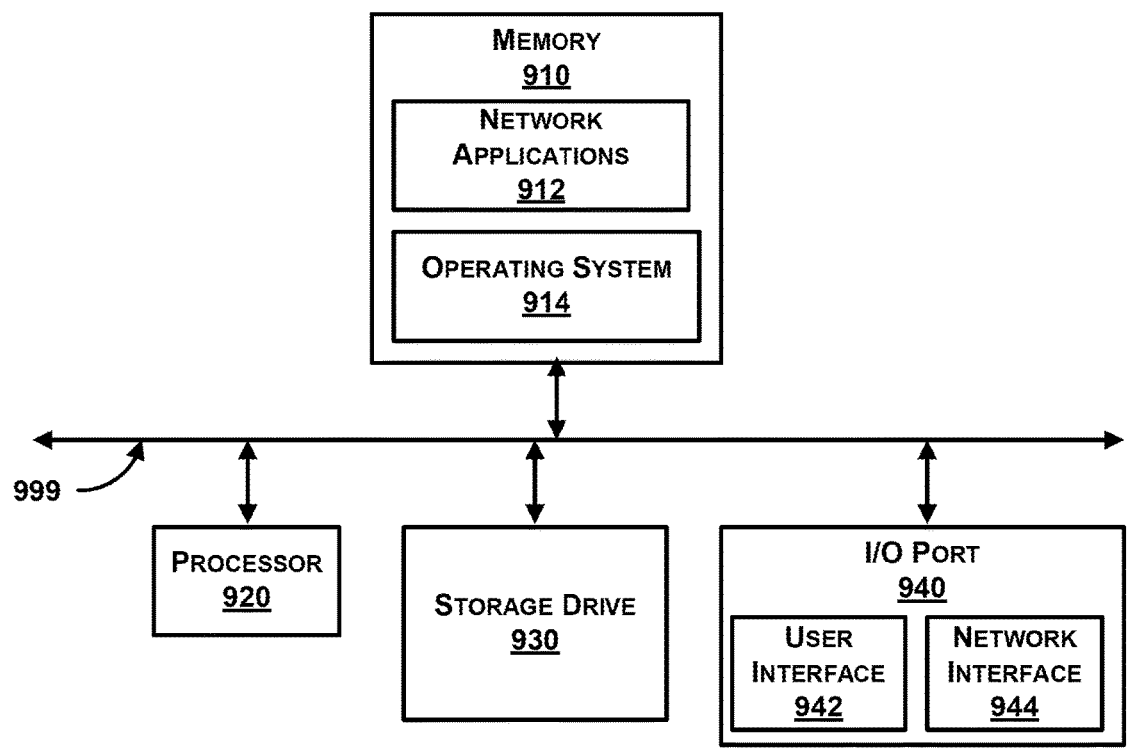
FIG. 9 is a block diagram illustrating an example computing device, according to one embodiment.

The network components of the system 100 can implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 9).

Figure 2:
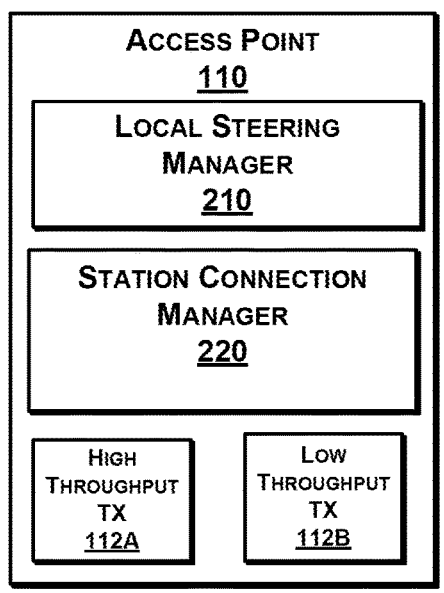
FIGS. 2-3 are more detailed block diagrams illustrating an access point and a Wi-Fi controller of the system of FIG. 1, respectively, according to some embodiments.

FIG. 2 is a more detailed block diagram illustrating the access point 110 of the system 100, according to one embodiment. The access point 110 comprises a local steering management module 210, a wireless station connection manager 220, and high throughput transceiver 112A and low throughput transceiver 112B. The components can be implemented in hardware, software, or a combination of both.

The local steering module 210 implements various algorithms to determine a channel assignment based on station exchange rate capability. One embodiment specifies specific ranges of exchange rate for assignment, while another embodiment considers specific capabilities, as defined by a local steering policy. The policy can be default or custom. A packet analyzer (not shown) determines whether a probe request complies with IEEE 802.11n, IEEE 802.11ac, or some other protocol. For example, an HT capabilities info field, a VHT capabilities field, or other fields are exposed and applied to the policy to determine a throughput assignment. Other policy factors can include number of connected stations, Wi-Fi controller provisioning for upcoming traffic expectations, and the like.

The wireless station connection manager 220 manages wireless station connections. A beacon generator (not shown) advertises services. A BSSID table stores BSSID assignments to wireless stations. A hand-off module (not shown) can facilitate fast hand-offs to and from neighboring access points.

The high throughput transceiver 112A and low throughput transceiver 112B each include a radio and antennae, and supporting component can include modulators, multiplexers and demultiplexers, and DSP modules. One or more channels can be supported at each transceiver which represent one or more transceivers.

Figure 3:
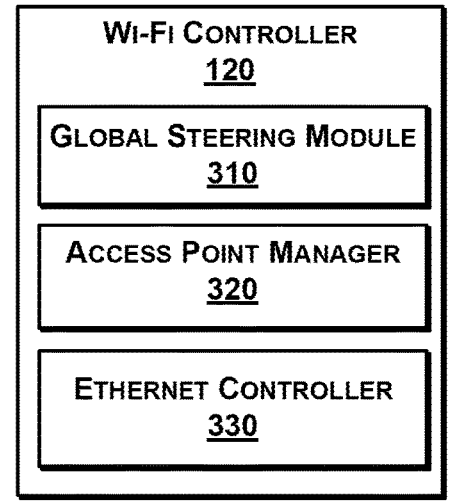

FIG. 3 is a more detailed block diagram illustrating a representative Wi-Fi controller 120 that comprises a global steering module 310, an access point manager 320, and an Ethernet controller 330. The components can be implemented in hardware, software, or a combination of both.

The global steering module 310 can distribute rules that the local steering management module 210 of the access point 110 and other access points, for uniformity and other global level concerns. In one embodiment, real-time conditions monitored by the Wi-Fi controller 120 at a different part of the network can affect the local steering module 120.

The access point manager 320 communicates with the access point 110 and other access points for Wi-Fi functionality such as beaconing, assigning BSSIDs, and handing-off stations between access points. The Ethernet controller 330 provides I/O ports for the network 199, and other directly connected devices.

FIGS. 4-5 are a block diagrams illustrating data packets indicative of HT and VHT capabilities, according to some embodiments. In FIG. 4, an IEEE 802.11n packet 400 with high throughput data is described. The fields include an HT capabilities field 410, a supported MCS set field 420, an HT extended capabilities field 430, and a transmit beamforming capabilities 440. In FIG. 5, an IEEE 802.11ac packet 500 with very high throughput data is described. The fields include a VHT capabilities info field 510, and a supported BHT MCS and NSS set field 520. Data in each of the fields can be used for determining channel assignments in view of station exchange rates.

Figure 6:
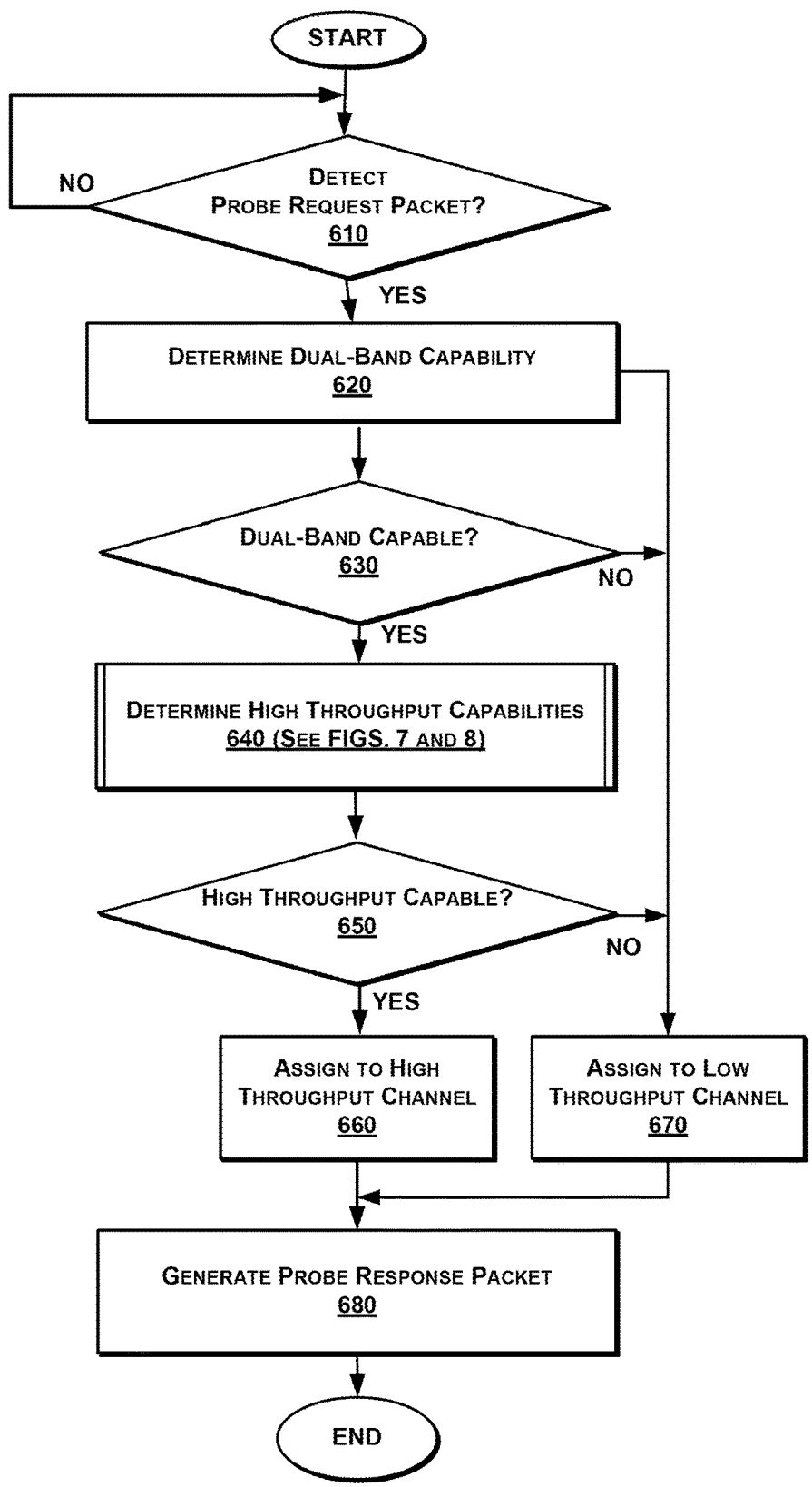
FIG. 6 is a high-level flow diagram illustrating a method for steering wireless stations of a Wi-Fi network based on data exchange capacity, according to one embodiment.

Methods Steering Wireless Stations Based on Data Exchange Capacity (FIG. 6-8)

FIG. 6 is a high-level flow diagram illustrating a method 600 for steering wireless stations of a Wi-Fi network based on data exchange capacity, according to one embodiment. One of ordinary skill in the art will recognize that the method 600 is non-limiting as other embodiments can have more or less steps and can be performed in a different order.

The access point, in one embodiment, operates normally to provide service discovery beacons and network access for wireless stations. The specialized process begins upon detecting a probe request from a wireless station (step 610). The wireless station can be joining the network or be in a hand-off procedure from a neighboring access point. Dual-band capability of the wireless station is determined (step 620). Responsive to having dual-band capability is determined (step 630), high throughput capabilities are determined (step 640), as described further in FIGS. 7 and 8 with respect to IEEE 802.11n and IEEE 802.11ac, accordingly. Responsive to having high throughput capability (step 650), the wireless station is assigned to one of the 5 GHz channels for high throughput (step 660).

On the other hand, the wireless station is assigned to one of the 2.4 GHz channels, regardless of dual-band capability which qualifies for 5 GHz channel usage, responsive to not having high throughput capability (step 670).

Finally, a probe response is generated to contain a channel assignment (step 680) and sent to the wireless station. The wireless station joins the stations being serviced under normal operations.

FIGS. 7-8 are each more detailed flow diagram illustrating the step of determining throughput capabilities from FIG. 6, according to one embodiment. In FIG. 7, a probe request indicating IEEE 802.11n capabilities is analyzed for HT capabilities (step 710). In this embodiment, if a predetermined channel width is supported (e.g., 20 MHz, 40 MHz, 80 MHz, 160 MHZ or 80+80 MHz operation) (step 720), or if forty MHz intolerant (step 730), the probe request is characterized high throughput (step 740). However, if neither the predetermined channel width qualifies or not forty MHz intolerant, the probe request is characterized as low throughput (step 750). In other embodiments, different factors, weighting, and different conditions may be considered in characterizing throughput.

In FIG. 8, a probe request indicating IEEE 802.11ac capabilities is analyzed for VHT capabilities (step 810). If any of the channel width if supported (step 820), beamformer capable (step 830), beamformee capable (step 840), or more than two spatial streams are supported, the probe request is characterized as high throughput (step 850). Similar to FIG. 7, if none of the conditions are satisfied, the probe request is characterized as low throughput (step 760).

Generic Computing Device (FIG. 9)

FIG. 9 is a block diagram illustrating an exemplary computing device 900 for use in the system 90 of FIG. 1, according to one embodiment. The computing device 900 is an exemplary device that is implementable for each of the components of the system 90, including the SDN controller 19, the Wi-Fi controller 120, the access points 130A-N, and the stations 140A-N. The computing device 900 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 900, of the present embodiment, includes a memory 99, a processor 920, a storage drive 930, and an I/O port 940. Each of the components is coupled for electronic communication via a bus 999. Communication can be digital and/or analog, and use any suitable protocol.

The memory 99 further comprises network applications 912 and an operating system 914. The network applications 912 can include the modules of the SDN controller 19, the Wi-Fi controller 120, or the access point 130, as illustrated in FIGS. 3-5. Other network applications 912 can include a web browser, a mobile application, an application that uses networking, a remote application executing locally, a network protocol application, a network management application, a network routing application, or the like.

The operating system 914 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 920 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 920 can be single core, multiple core, or include more than one processing elements. The processor 920 can be disposed on silicon or any other suitable material. The processor 920 can receive and execute instructions and data stored in the memory 99 or the storage drive 930

The storage drive 930 can be any non-volatile type of storage such as a magnetic disc, EEPROM (electronically erasable programmable read-only memory), Flash, or the like. The storage drive 930 stores code and data for applications.

The I/O port 940 further comprises a user interface 942 and a network interface 944. The user interface 942 can output to a display device and receive input from, for example, a keyboard. The network interface 944 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method, in an access point of a data communication network, for steering wireless stations based on station data exchange capacity, the method comprising the steps of:
   detecting a probe request data packet from a wireless station seeking to join a channel of the plurality of channels supported by the access point;
   determining dual-band capability of the wireless station as indicated by the probe request, and assigning the wireless station to a low throughput channel responsive to not having dual-band capability;
   responsive to having dual-band capability, determining a high throughput capability of the wireless station as indicated by the probe request;
   responsive to having dual-band capability and high throughput capability, assigning the wireless station to a high throughput channel;
   responsive to having dual-band capability and not having high throughput capability, assigning the wireless station to a low throughput channel; and
   generating a probe response data packet for transmission to the wireless station, the probe response comprising a channel assignment of at least one of the low throughput channel and the high throughput channel.

2. The method of claim 1, further comprising:
   determining that very high throughput capability is unavailable; and
   determining a modulation type as a factor for implying very high throughput capability.

3. The method of claim 1, wherein determining the high throughput capability comprises:
   determining a modulation type.

4. The method of claim 1, wherein determining the high throughput capability comprises:
   determining MU beamformer transmit capability; and
   responsive to having MU beamformer transmit capability, assign to the high throughput channel.

5. The method of claim 1, wherein determining the high throughput capability comprises:
   determining MU beamformee capability; and
   responsive to having MU beamformee capability, assign to the high throughput channel.

6. The method of claim 1, wherein determining the high throughput capability comprises:
   determining supported channel width set; and
   responsive to having a supported channel width, assign to the high throughput channel.

7. The method of claim 1, wherein determining the high throughput capability comprises:
   determining 40 MHz Intolerance; and
   responsive to having 40 MHz intolerance, assign to the high throughput channel.

8. The method of claim 1, wherein determining the high throughput capability comprises:
   determining whether more than two spatial transmit streams are supported; and
   responsive to having support for more than two spatial transmit streams, assign to the high throughput channel.

9. The method of claim 1, wherein the high throughput channel comprises a 5.0GHz channel and the low throughput channel comprises a 2.4GHz channel.

10. A non-transitory computer-readable medium that, when executed by a processor, performs a computer-implemented method, in an access point, for steering wireless stations based on station data exchange capacity, the method comprising the steps of:
    detecting a probe request data packet from a wireless station seeking to join a channel of the plurality of channels supported by the access point;
    determining dual-band capability of the wireless station as indicated by the probe request, and assigning the wireless station to a low throughput channel responsive to not having dual-band capability;
    responsive to having dual-band capability, determining a high throughput capability of the wireless station as indicated by the probe request;
    responsive to having dual-band capability and high throughput capability, assigning the wireless station to a high throughput channel;
    responsive to having dual-band capability and not having high throughput capability, assigning the wireless station to a low throughput channel; and
    generating a probe response data packet for transmission to the wireless station, the probe response comprising a channel assignment of at least one of the low throughput channel and the high throughput channel.

11. The non-transitory computer-readable medium of claim 10, wherein the method further comprises:
    determining that very high throughput capability is unavailable; and
    determining a modulation type as a factor for implying very high throughput capability.

12. The non-transitory computer-readable medium of claim 10, wherein the determining the high throughput capability comprises:
   determining a modulation type.

13. The non-transitory computer-readable medium of claim 10, wherein the method further comprises, wherein the determining the high output capability comprises:
   determining MU beamformer transmit capability; and
   responsive to having MU beamformer transmit capability, assign to the high throughput channel.

14. The non-transitory computer-readable medium of claim 10, wherein the method further comprises, wherein the determining the high output capability comprises:
   determining MU beamformee capability; and
   responsive to having MU beamformee capability, assign to the high throughput channel.

15. The non-transitory computer-readable medium of claim 10, wherein the method further comprises, wherein the determining the high output capability comprises:
   determining supported channel width set; and
   responsive to having a supported channel width, assign to the high throughput channel.

16. The non-transitory computer-readable medium of claim 10, wherein the method further comprises, wherein the determining the high output capability comprises:
   determining 40MHz Intolerance; and
   responsive to having 40 MHz intolerance, assign to the high throughput channel.

17. The non-transitory computer-readable medium of claim 10, wherein the method further comprises, wherein the determining the high output capability comprises:
   determining whether more than two spatial transmit streams are supported; and
   responsive to having support for more than two spatial transmit streams, assign to the high throughput channel.

18. The non-transitory computer-readable medium of claim 10, wherein the high throughput channel comprises a 5.0GHz channel and the low throughput channel comprises a 2.4GHz channel.

19. An access point for steering wireless stations based on station data exchange capacity, the access point comprising:
   a processor;
   a network interface;
   a memory,
   wherein the network interface detects a probe request data packet from a wireless station seeking to join a channel of the plurality of channels supported by the access point;
   a local steering module comprising a packet analyzer to determining dual-band capability of the wireless station as indicated by the probe request, and assigning the wireless station to a low throughput channel responsive to not having dual-band capability,
   wherein the local steering module, responsive to having dual-band capability, determines a high throughput capability of the wireless station as indicated by the probe request,
   wherein the local steering module, responsive to having high throughput capability, assigns the wireless station to a high throughput channel; and
   a station connection manager to generate a probe response data packet for transmission to the wireless station, the probe response comprising a channel assignment of at least one of the low throughput channel and the high throughput channel.

\* \* \* \* \*